July 26, 1949.  J. A. GITS  2,477,368
INJECTION MOLDING APPARATUS
Filed April 17, 1946  3 Sheets-Sheet 1
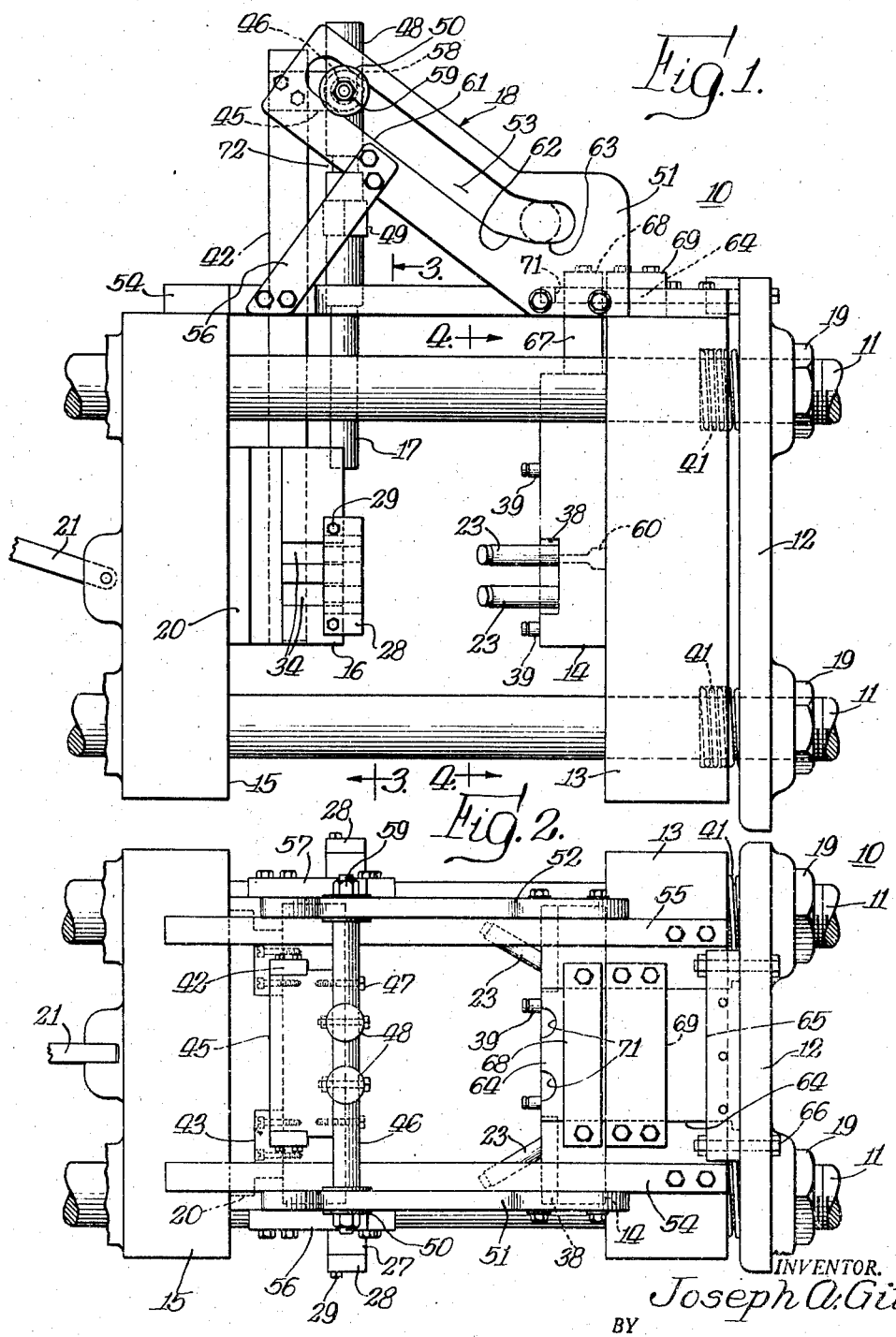
INVENTOR.
Joseph A. Gits July 26, 1949.  J. A. GITS  2,477,368
INJECTION MOLDING APPARATUS
Filed April 17, 1946  3 Sheets-Sheet 2

INVENTOR.
Joseph A. Gits.
BY
Thiess, Olson & Mecklenburger
Attys.

July 26, 1949.　　　　　J. A. GITS　　　　　2,477,368
INJECTION MOLDING APPARATUS
Filed April 17, 1946　　　　　　　　　　　3 Sheets-Sheet 3
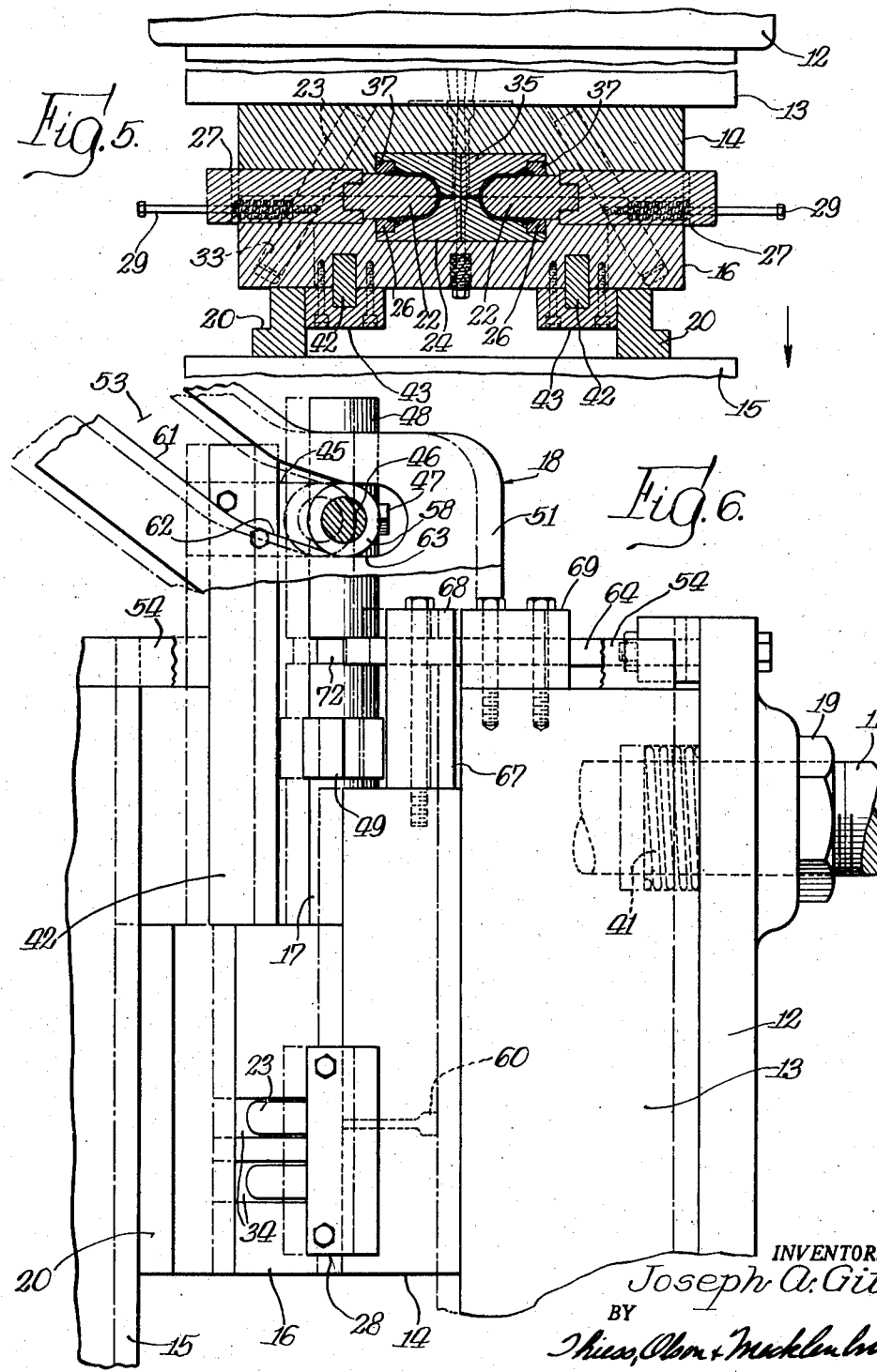

Patented July 26, 1949

2,477,368

UNITED STATES PATENT OFFICE 2,477,368

INJECTION MOLDING APPARATUS

Joseph A. Gits, Chicago, Ill.

Application April 17, 1946, Serial No. 662,818

14 Claims. (Cl. 18—16)

This invention relates to apparatus for molding plastic articles, and more particularly to core withdrawing and inserting apparatus for the molds or dies to be used therewith.

Molding apparatus commonly include a pair of separable mold or die members having cavities therein conforming to the exterior shape of the article to be molded, and a core movable into and out of the mold cavity where the molded article has an interior cavity, the core conforming to the shape thereof. During the molding operation, the die members are first held together with the core inside of the mold cavity while injection of the material takes place to mold the article and thereafter, following a suitable time delay for the plastic to set, one of the die members moves away from the other relatively stationary die member to open the mold. Concurrently therewith, the core is withdrawn and after complete withdrawal thereof, together with complete opening movement of the movable die member, the molded article may be removed by the operator. In continuing the operation, the movable die member is moved toward the relatively stationary die member and concurrently the core is inserted into the mold cavity. When the die members are together, i. e., the mold is closed, the core is held in the mold cavity and injection of the material may occur, repeating the operation.

In apparatus as described, the molding material is injected into the mold cavity under high pressures which may equal several thousands of pounds per square inch, e. g., twenty thousand pounds per square inch in some instances. Under this high pressure the material flows into the cavity around the core, adhering thereto very closely and tightly, making it necessary to exert a large force to break away the core from the molded article. Moreover, the core must be broken away while the die members are substantially closed, because after separation thereof, there is no longer any substantial support for the article within the mold cavity. Core members may undergo a movement of substantial length before clearing the molded article to permit removal thereof from the die, this movement preferably taking place during die opening so that there is no delay in the machine operation. Removing the core, accordingly, requires rapid movement thereof, which of necessity requires a large force with consequent heavy strain on the operating parts if done against the adherence of the molded article.

Heretofore, cores have been removed through the use of pistons and air cylinders, and gear racks. These arrangements are bulky, difficult to adjust and adapt for different operating set-ups, and inefficient in operation.

It is an object of the invention to provide improved apparatus of the character indicated wherein the core is initially broken away from the molded article substantially at the instant of die member separation and thereafter is moved out of the mold cavity at a relatively rapid rate.

It is a further object of the invention to provide improved apparatus of the character indicated wherein the core is extracted from the mold cavity at two rates of movement, a slow rate substantially at the instant of die member separation, and a relatively rapid rate thereafter.

It is a further object of the invention to provide improved apparatus of the character indicated wherein the core is positively positioned in the mold cavity during the injection process.

It is a further object of the invention to provide improved apparatus of the character indicated that is efficient in operation, simple and compact in design, and easy to adjust and adapt for different operating set-ups.

In carrying out the invention in one form, injection molding apparatus is provided comprising a die including a pair of die members forming a mold cavity, one of the die members being movable relative to the other to open and close the die. A core member is receivable between the die members and is movable into and out of the mold cavity during die closing and opening. Cam means are associated with the die members and the core member for removing the core from the mold cavity at a slow rate substantially at the instant of die opening, and at a rapid rate thereafter.

For a more complete understanding of the invention, reference should now be had to the accompanying drawings in which:

Figure 1 is a side view of injection molding apparatus embodying the invention with the die members thereof in a completely open position;

Fig. 2 is a top view of the apparatus shown in Fig. 1;

Fig. 5 is a sectional view taken substantially in the direction of arrows 5—5 of Fig. 3 with the die members in a closed position; and Fig. 6 is an enlarged fragmentary view of Fig. 1, partially in section and partially broken away, with the die members in closed position.

Figure 3:
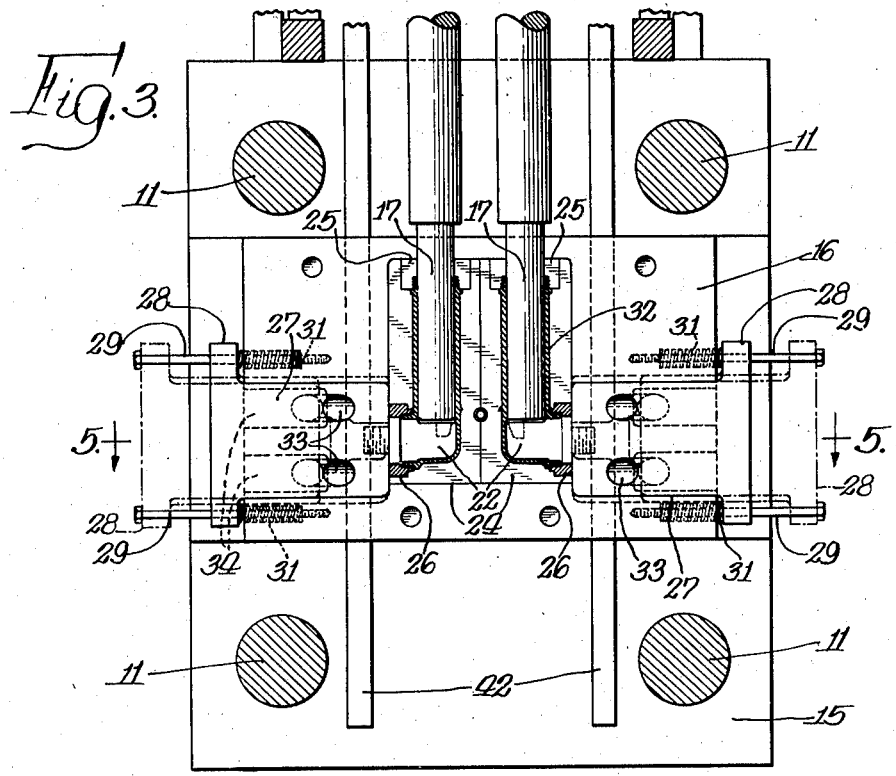
Fig. 3 is a view taken substantially in the direction of arrows 3—3 of Fig. 1 with the die members in the closed position.

Referring to the drawings, the invention is shown embodied in apparatus 10 comprising a series of parallel tie bars 11, a stationary tie bar plate 12, a relatively stationary die carrier 13, a die member 14 attached thereto, a relatively movable die carrier 15, a die member 16 attached thereto, a pair of cores 17, and apparatus 18 for inserting and withdrawing the cores. Tie bar plate 12 is fixedly arranged on the bars 11 at one end thereof, but is adjustable relative thereto by means of the nuts 19 threaded thereon. The tie bars extend through openings or bearing surfaces in die carrier 13, through corresponding openings or bearing surfaces in die carrier 15, and at the other end are held in a suitable tie bar plate, not shown, to complete the general framework of the apparatus. Movable die carrier 15 is reciprocable along tie bars 11 on its bearing surfaces to open and close the die or mold cavity through die operating means illustrated schematically as lever 21.

Die members 14 and 16 are provided with interior cavities corresponding to the respective exterior contours of the article to be molded, so that when the die members are together a complete mold cavity is formed. Where objects with interior openings are to be molded, the cores provided have exteriorly the contours of the interior openings. For example, die members 14 and 16 are shown adapted for molding a pair of hollow angular head flashlight casings 32 simultaneously (Figs. 3 and 4), requiring the use of two vertically moving cores 17 and two horizontally moving cores 22. When the die is completely open, i. e., the die members are completely separated, as shown in Fig. 1, core members 17 are out of the mold cavities and, as shown by dotted and dashed lines in Fig. 3, horizontal cores 22 are also out of the die. Cores 17 are moved inwardly and outwardly of the mold cavities concurrently with die closing and opening by the cam apparatus 18, and horizontal cores 22 are moved inwardly and outwardly by means of the angularly extending prongs 23.

Die member 16 comprising a relatively solid piece of metal is spaced from die carrier 15 by die shoes 20 to provide space for some of the core actuating mechanism and may be attached to die carrier 15 by any suitable means such, for example, as bolts and clamps, not shown. A relatively rectangular cut-out portion is formed in die member 16 into which are placed die forms or inserts 24 provided with cavities having the shape of the exterior surface of the flashlights to be molded. Die forms 24 may be held within die member 16 in any suitable manner, such for example as by bolts, not shown. The angular head flashlights, having threads at the end of the base as well as at the end of the angular head, the replaceable inserts 25 and 26 including threads are placed in die forms 24 for completing the die cavity with the proper contour.

Figure 4:
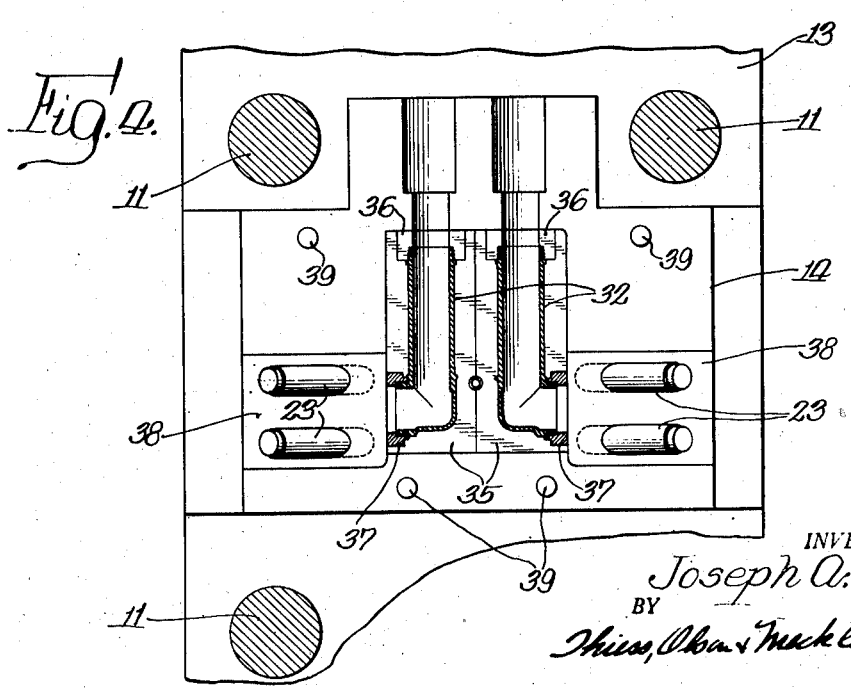
Fig. 4 is a view taken substantially in the direction of arrows 4—4 of Fig. 1 with the die members in an open position.

For moving cores 22 in and out, core carriers 27 are adapted to slide in dovetail horizontal guideways in die member 16 adjacent the lower portion thereof, each carrier supporting one of the cores. At their outward ends, core carriers 27 include enlared heads 28 having transverse holes through which bolts 29 are relatively loosely adapted to pass for attaching core carriers 27 to die member 16. Arranged between the inside surface of heads 28 and within an opening in die member 16, there are springs 31 biasing the core carriers outwardly, bolts 29 serving additionally to guide the core carriers in their inward and outward movements. Formed in each core carrier is a pair of oval-shaped holes 33 extending angularly through the core carriers in a direction from inward to outward, and directly behind the rearward opening thereof are cut-out portions 34 within die member 16 for a purpose to be described. In Fig. 3, cores 17 as well as cores 22 are shown in their inward or inserted positions, and the angular head flashlights 32 are shown in section.

Die member 14, attached to die carrier 13 by any suitable means such, for example, as bolts and clamps, not shown, is complementarily similar to die member 16 and includes a relatively large metal block including a rectangular cavity for receiving die forms 35 which correspond to die forms 24 of die member 16. Die forms 35 have interior cavities corresponding to the exterior contour of angular head flashlights 32, and are provided with replaceable threaded inserts 36 and 37 to complete the die configuration for the flashlights. Adjacent the lower portion of die member 14 there are inward rectangular cut-out portions 38 whose edges complete the horizontal guideways for core carriers 27 when the cooperating portions thereof are received within the cut-out portions, i. e., when the die members approach each other, and are together.

Prongs 23 project angularly outwardly from die member 14 and from within cut-out portions 38, the prongs having a cross section corresponding to that of the oval holes 33 whereby when the die members come together, prongs 23 are receivable within the holes 33. During separation of the die members, horizontal core carriers 27 are in their outward position, and, in this position, the ends of prongs 23 may be received within holes 33 when the die members approach each other. As the die members continue to approach each other and the prongs move into holes 33, cores 22 are moved inwardly, against the bias of springs 31, by virtue of the angular prongs exerting a camming force against core carriers 27. As die members 14 and 16 approach their final closed positions, dowel pins 39 in die member 14 are received within corresponding openings in die member 16 for aligning the die members with respect to each other. Conversely, when die member 16 is moving away from die member 14, core carriers 27 are cammed outwardly by prongs 23 and holes 33, since the core carriers are constrained to move with die member 16 by the dovetail horizontal guideways therein and the bolts 29, as well as under the influence of springs 31.

Movable die carrier 15, in being moved to die closed position by operating member 21, brings die member 16 into position against die member 14 (Fig. 6). To cushion the force of contact between the die members and to assure that the die members are actually abutting when die carrier 15 ceases its movement, die carrier 13 may move a limited amount along tie bars 11, which movement is resiliently resisted by relatively heavy springs 41. In Fig. 1, die carrier 13 is shown in its position of farthest movement away from tie bar plate 12, this movement beginning to occur when die carrier 15 first begins its opening movement. That is, when die carrier 15 first begins its opening movement, die carriers 13 and 15 move together away from plate 12 until die member 13 reaches the position of maximum movement therefrom, whereupon the continued movement of die carrier 15 actually separates the die members. Conversely, in closing the die, die carrier 15 moves by itself until die member 16 abuts die member 14, whereupon die carriers 15 and 13 move together against the resisting force of springs 41 until die member 13 abuts the tie bar plate 12.

The cooperating faces of die members 14 and 16 and the cooperating faces of die forms 24 and 35 are aligned with each other so as properly to form the mold cavity and are very accurately machined and finished so as to abut each other very accurately in the closed position of the apparatus, whereby the molding material may be injected into the mold cavity without its coming out along the surface between the die members.

Under the influence of die carrier 15 moving inwardly and outwardly, cores 17 are moved respectively downwardly into and upwardly out of the mold cavity through cooperation with cam apparatus 18. Cores 17 are constrained relative to die member 16 so that the cores move relative thereto in its opening and closing movements, the cores moving only vertically with reference to die member 16 by virtue of the constraint and cam apparatus 18. A pair of vertically extending grooves into which are received the slide or guide bars 42 are provided in die member 16. Guide bars 42 are constrained to remain in their cooperating guide grooves by means of similarly grooved gibs 43 bolted, for example, to the rear face of die member 16. The grooves in gibs 43 and in die member 16 form keyways or guide grooves in which guide bars 42 may move vertically up and down along with cores 17.

Guide bars 42 extend vertically upwardly to a position determined by the length of travel of cores 17 in order to remove them from the mold cavity, and adjacent their upper ends are bolted to a transversely lying plate or yoke 45 extending between them. At the right hand edge of yoke 45 a transverse bar 46 is bolted thereto by means of bolts 47, the transverse bar passing through corresponding openings in vertical connecting rods 48. Vertical connecting rods 48 are laterally spaced so as to be in alignment respectively with cores 17 and are bolted to transverse bar 46 as shown so as to be rigidly fixed in position. At their lower ends, connecting rods 48 are attached to the upper ends of cores 17 by means of split collars 49. The dimensions of yoke 45 in cooperating with guide bars 42 are such that the vertical connecting rods hold cores 17 in the necessary alignment for them to move vertically into the mold cavity without having to move longitudinally relative to die member 16. Guide bars 42, yoke 45, transverse bar 46, and connecting rods 48 form a convenient and advantageous means for cooperating with cam means 18 to move cores 17 into and out of the mold cavity. Through proper choice of guide bar and connecting rod lengths, cores of different lengths in different operating set-ups may be used in the same apparatus.

Referring to Figs. 1, 2 and 6, cam apparatus 18 comprises a pair of cam members 51 and 52, each provided with a slot or guide 53 extending angularly upwardly relative to the injection molding apparatus. Cam members 51 and 52, at their right ends, are bolted to longitudinally extending bars 54 and 55 respectively, which in turn are bolted at their right ends to die carrier 13. Adjacent the other end of bars 54 and 55, bracing members 56 and 57 are bolted thereto and to cam members 51 and 52 respectively, thereby to hold the cam members in vertically rigid positions. Since bars 54 and 55 are bolted to die carrier 13, these longitudinal bars, as well as cam members 51 and 52, move with die carrier 13 during its small movements in die opening and closing. During subsequent opening and beginning closing movements of die carrier 15, cam members 51 and 52 remain stationary together with die carrier 13.

Transverse bar 46 is provided with bearing portions at each end received within the angularly extending grooves 53. The bearing surfaces may comprise, for example, sleeves or collars 58 received over threaded studs projecting from the end of the transverse bar 46, nuts 59 and washers 50 being provided to secure the bearing collars 58 thereto. The upward ends of angular grooves 53 are adjacent the open position of die member 16, and the lower ends of grooves 53 are adjacent die member 14. Accordingly, it may be seen that when die carrier 15 moves die member 16 from the open position shown in Fig. 1 to the closed position shown in Fig. 6, the transverse bar 46 is constrained to move downwardly following angular grooves 53. In so doing, guide bars 42 move downwardly guiding cores 17 downwardly into the mold cavities. Conversely, when die carrier 15 moves die member 16 to the open position, the transverse bar 46 is constrained to move upwardly and thereby carry the cores out of the mold cavities.

Each groove 53 includes three separate portions 61, 62 and 63, the portion 61 comprising a relatively steep cam surface and constituting the major portion of the groove. The portion 63 is horizontal at the lower right end of cam members 51 and 52 and is the portion on which bearing member 58 rests when the die is in its completely closed position after all downward movement of the cores has ceased. Between portions 61 and 63 is the portion 62 forming a cam surface of a relatively low slope compared to that of portion 61. Cam surface 62 is of relatively short length and extends angularly upwardly from horizontal portion 63 so as to be tangent to the bearing collar 58 when the cores are in the completely downward position.

The operation of the apparatus to move the cores into the mold cavities and outwardly thereof may now be visualized. Assuming that the die is completely closed and that injection of the plastic material has just occurred through the sprue 60, the positions of the various die members will be as shown by the solid lines in Fig. 6 with die carrier 13 abutting tie bar plate 12 and there is a very high pressure in the mold cavities. As operating member 21 begins to move die carrier 15 toward the left, die carrier 13 moves with it under the influence of springs 41, as also do cam members 51 and 52, together with cores 17 and appurtenant members. Consequently, until the die carriers have moved to the dotted and dashed line positions shown in Fig. 6, there will have been no vertical movement of the cores (i. e., cam apparatus 18 has been ineffective). This is so, since the die members may not be separated safely until the high pressure exerted by the injected plastic material has been reduced. Under this high pressure, cores 17 are preferably held tightly within the mold cavity. After the die members have reached the dot-dash position (Fig. 6), this movement being small compared to the full opening movement, die carrier 13 remains stationary (position shown in Fig. 1), and hence cam members 51 and 52 also remain stationary. Therefore, the continued movement of die carrier 15 separates the die members and through guide bars 42 forces the transverse bar 46 and bearing collars 58 to follow along the cam portions 62 and 61 in succession. Since cam portions 62 are tangent to bearing collars 58 in the final closed position of the cores and therefore also tangent thereto at the initial opening positions, cores 17 are forced to move vertically by virtue of bearing collars 58 following along cam surfaces 62 at the instant of the movement of die member 16 away from die member 14.

A short time prior to the die separation, the pressure due to the injection has been relieved by the movement of die member 14, thereby breaking the connection of sprue 60 with an injection nozzle, not shown, but the cores are still held very tightly by the plastic material which has been molded around them. Hence, the cores must be broken away from the molded articles and this is done preferably by moving the cores initially at a slow rate. Consequently, the cam surface 62 extends upwardly at its low slope or small angle, which for example may be approximately 20°. Then, at the instant of die member separation, while the molded articles are still being held by the mold cavities, the core members are moved outwardly a small amount to break them loose from the molded articles, the holding by the mold cavities preventing injury thereto. The low angularity of cam surface 62 exerts the force to break the cores loose, only a small initial movement being necessary for this, and such initial movement is secured by virtue of the low angularity without placing undue strain on the machine parts.

After die member 16 has separated completely from die member 14, the cores 17 being already broken loose from the molded articles, there is no further reason for slow movement of the cores since they no longer adhere to the molded article. Accordingly, the length of cam portion 62 is small so that following a relatively small movement of die member 16, after the die members have separated completely, bearing collars 58 contact cam portions 61 with resultant rapid outward movement of the cores to their final positions. The height of groove 53 is such that the cores are completely removed from the mold cavity by the time the die carrier 15 has reached its stationary position in order that the molded article may be removed by the operator. Thereafter, when the die closes, the cores are moved downward rapidly at first and then slowly.

In the closed position of the die, the cores are held positively in their proper positions during the actual injection step. To this end, vertical connecting rods 48 are provided with semicircular grooves 72 adapted to receive therein the cooperating projecting end of a hold-down plate 64. Hold-down plate 64, being attached at its right end to tie bar plate 12 by means of the yoke 65 and bolts 66, does not move with die carriers 15 and 13, but is completely stationary at all times relative to tie bar plate 12. Hold-down plate 64 is held at its forward end in its upwardly spaced position by space block 67 (Fig. 1), is vertically constrained relative to die member 14 and die carrier 13 by tie plates or straps 68 and 69 while permitting relative longitudinal movement. The forward end of hold-down plate 64 is provided with a pair of semicircular cut-out portions 71 (Fig. 2) to fit into the corresponding circular grooves 72 in vertical connecting rods 48. When die member 16 is moved toward its right-hand position and has abutted die member 14, grooves 72 come opposite cut-out portions 71. With the continued movement together of die carriers 15 and 13, hold-down plate 64 remaining stationary, cut-out portions 71 move into grooves 72, thereby causing connecting rods 48 and hold-down plate 68 to engage. Conversely, during the opening movement of the die members, when die carriers 15 and 13 are moving together, hold-down plate 64 remains stationary and causes cut-out portions 71 to move out of grooves 72. As a consequence, during the injection step when die carrier 13 is abutted by tie bar plate 12, the vertical connecting rods 48 are rigidly held in their vertical position.

Having thus described my invention, what I claim and desire to secure by Letters Patent is:

1. In molding apparatus for injection molding having a pair of die members forming a mold cavity, one of which is movable relative to the other to open and close said cavity, and a core member relatively movable into and out of said cavity, apparatus for moving said core into said cavity during closing movement of said one die member and out of said cavity during opening movement of said one die member comprising a cam device including a cam surface having first and second working portions, said first working portion having a low angularity relative to the direction of die movement, said second working portion having a greater angularity relative to the direction of die movement, means attached to said core and engaging said cam surface, said engaging means engaging said cam surface adjacent said first working portion in the closed position of said die members, and means for effecting relative movement between said engaging means and said cam surface when said die members move relative to each other.

2. Apparatus for removing a core from the die of an injection molding machine comprising cam means associated with said die, said cam means including a pair of cam surfaces one of which is on each side of said core, each of said surfaces having a first working portion and a second working portion, said first working portion having a low angularity relative to the direction of die movement, said second working portion having a greater angularity relative to the direction of die movement, means connected to said core lying substantially in a transverse plane containing said core and engaging each of said cam surfaces, said connecting means engaging said cam surfaces adjacent said first working portion when said die is closed, and means movable when said die opens for moving said connecting means and said cam surfaces relative to each other first along said first working portion followed by said second working portion.

3. Injection molding apparatus having a pair of die members, one of which is movable relative to the other to open and close the die and a core movable into and out of the die comprising a pair of cam surfaces stationary during at least a portion of said opening and closing each of said pair of cam surfaces having a first working portion and a second working portion, said first working portion having a low angularity relative to the direction of die movement, said second working portion having a greater angularity relative to the direction of die movement, means connected to said core lying substantially in a transverse plane containing said core and engaging each of said cam surfaces, and means movable with said movable die member to move said connecting means along said cam surfaces, said first working portion being arranged relative to said connecting means whereby said connecting means engages said first working portion substantially at the instant the die members separate and engages said second working portion after said die members have separated.

4. Injection molding apparatus comprising a die including a pair of die members forming a mold cavity and movable together as an initial step in die opening followed by movement of one die member relative to the other to complete the die opening, a core member receivable between said die members, said core member being stationary relative thereto during said movement together of said die members and movable relative thereto during said relative movement of said one die member, cam means associated with said die members having a cam surface, said cam surface including a first working portion and a second working portion, said first working portion having a low angularity relative to the direction of die movement, said second working portion having a greater angularity relative to the direction of die movement, means connected to said core member and engaging said cam surface, and means for moving said core with said movable die member whereby said connecting means is moved along said cam surface, first along said first working portion and secondly along said second working portion during die opening to remove said core from said mold cavity, said first working portion being engaged by said connecting means substantially at the instant said die members separate and said second working portion being engaged by said connecting means after said die members have separated.

5. Injection molding apparatus comprising a die including a pair of die members forming a mold cavity and movable together preceding die opening followed by a movement of one die member relative to the other to open said die, a core member receivable between said die members, said core member being stationary relative thereto during said movement together of said die members and movable relative thereto during said relative movement of said one die member, and cam means associated with said die members and said core member for removing said core member from said mold cavity at a slow rate substantially at the instant following the end of said movement together and at a rapid rate after said die opening.

6. Injection molding apparatus comprising a die including a pair of die members forming a mold cavity, one of which is movable relative to the other to open and close said die, a core member receivable between said die members and movable into and out of said mold cavity, cam means including a cam surface having two operative portions, one of which has a low rate of change relative to the direction of die movement and the other of which has a high rate of change relative to the direction of die movement, means connected to said core and engaging said cam surface, and means for moving said cam surface and said means engaging said cam surface relative to each other during the opening and closing movements of said one die member, said portion of low rate of change and said engaging means being adjacent each other substantially at the instant of die opening whereby said core is moved out of said cavity at an initially low rate and thereafter at a high rate.

7. Injection molding apparatus comprising a die including a pair of die members forming a mold cavity, one of which is movable relative to the other to open and close said die, a core member receivable between said die members and movable into and out of said mold cavity, interengaging means for positively holding said core member from moving into or out of said mold cavity when said die is closed, cam means including a cam surface having two operative portions, one of which has a low rate of change relative to the direction of die movement and the other of which has a high rate of change relative to the direction of die movement, means connected to said core and engaging said cam surface, and means for moving said cam surface and said means engaging said cam surface relative to each other during the opening and closing of said die, said portion of low rate of change and said engaging means being adjacent each other substantially at the instant of die opening whereby said core is moved out of said cavity at an initially low rate and thereafter at a high rate.

8. Injection molding apparatus comprising a die including a pair of die members forming a mold cavity, one of which die members is movable relative to the other to open and close said die, a core member receivable between said die members and movable into and out of said mold cavity, a stationary cam device having a first working portion of small angularity relative to the direction of die movement and a second working portion of large angularity relative to the direction of die movement, means connected to said core and engaging said cam, means movable when said one die member moves relative to the other for moving said cam engaging means relative to said cam whereby said core member is moved into and out of said mold cavity, said portion of small angularity and said cam engaging means being adjacent each other substantially at the instant of die opening thereby to move said core out of said mold cavity at a slow rate initially, and means for positively holding said core within said mold cavity when said die is closed.

9. Injection molding apparatus comprising a die including a pair of die members forming a mold cavity movable together as an initial step in die opening followed by a movement of one die member relative to the other to complete the die opening, a core member receivable between said die members and movable into and out of said mold cavity during closing and opening movements respectively of said die members, cam means associated with said die members for removing said core after said movement together at an initially slow rate followed by a rapid rate, and interengaging means for positively holding said core member from moving into or out of said mold cavity during said die closed position and during at least a portion of said movement together.

10. Injection molding apparatus comprising a die including a pair of die members forming a mold cavity movable together as an initial step in die opening followed by a movement of one die member relative to the other to complete the die opening, a core member receivable between said die members and movable into and out of said mold cavity during closing and opening movements respectively of said die members, a cam device stationary during at least a portion of said opening and closing movements having a first working portion of small angularity relative to the direction of die movement and a second working portion of large angularity relative to the direction of die movement, means connected to said core and engaging said cam, means movable when said one die member moves relative to the other for moving said cam engaging means relative to said cam whereby said core member is moved into and out of said mold cavity, said portion of small angularity and said cam engaging means being adjacent each other substantially at the end of said movement together whereby said core is moved out of said cavity at a slow rate initially followed by a rapid rate, and interengaging means for positively holding said core from moving into or out of said mold cavity during said die closed position and during at least a portion of said movement together.

11. Injection molding apparatus comprising a die including a pair of die members forming a mold cavity movable together as an initial step in die opening followed by a movement of one die member relative to the other to complete the die opening, a core member receivable between said die members and movable into and out of said mold cavity, a cam surface movable with said die member during said movement together and stationary thereafter during opening of said die, and means connected to said core and cooperating with said cam means for preventing movement of said core out of said mold cavity during said movement together and thereafter moving said core out of said mold cavity at an initially slow rate followed by a rapid rate.

12. Injection molding apparatus comprising a die including a pair of die members forming a mold cavity movable together as an initial step in die opening followed by a movement of one die member relative to the other to complete the opening, a core member receivable between said die members and movable into and out of said mold cavity, a cam surface movable with said die member during said movement together and stationary thereafter during opening of said die, means connected to said core and cooperating with said cam means for moving said core out of said mold cavity after said movement together at an initially slow rate followed by a rapid rate, and interengaging means for positively holding said core from moving into or out of said mold cavity during at least part of said movement together.

13. Injection molding apparatus comprising a die including a pair of die members forming a mold cavity movable together as an initial step in die opening followed by a movement of one die member relative to the other to complete the opening, a core member receivable between said die members and movable into and out of said mold cavity, and cam means including a cam surface associated with said die members for moving said core member out of said mold cavity after die opening at an initially slow rate followed by a rapid rate, said cam surface being fixed to the relatively stationary one of said die members whereby said cam means is ineffective during the movement together of said die members.

14. Injection molding apparatus comprising a die including a pair of die members forming a mold cavity movable together as an initial step in die opening followed by a movement of one die member relative to the other to complete the die opening, a core member receivable between said die members and movable into and out of said mold cavity, cam means including a cam surface having a first working portion and a second working portion, said first working portion having a low angularity relative to the direction of die movement, said second working portion having a greater angularity relative to the direction of die movement, said cam means being movable with said die members during said movement together and stationary thereafter, means connected to said core and engaging said cam surface, and means for moving said engaging means relative to said cam surface only after said movement together for moving said core out of said mold cavity, said engaging means being adjacent said portion of low angularity substantially at the end of said movement together whereby said core is moved out of said mold cavity at an initially slow rate followed by a rapid rate, and interengaging means for positively preventing movement of said core into and out of said mold cavity during said die closed position and during at least a part of said movement together.

JOSEPH A. GITS.

REFERENCES CITED

The following references are of record in the file of this patent:

UNITED STATES PATENTS

| Number | Name | Date |
|---|---|---|
| 1,961,942 | Pack | June 5, 1934 |
| 2,033,036 | Korsmo | Mar. 3, 1936 |
| 2,107,190 | Shaw | Feb. 1, 1938 |
| 2,131,955 | Johnson | Oct. 4, 1938 |

FOREIGN PATENTS

| Number | Country | Date |
|---|---|---|
| 341,132 | Great Britain | Jan. 15, 1931 |

OTHER REFERENCES

"Die Casting," by Herb, pages 189 and 190, a textbook published in 1936 by the Industrial Press of N. Y. C. Copy in Div. 3.